(12) United States Patent
McLaney

(10) Patent No.: US 12,354,120 B2
(45) Date of Patent: *Jul. 8, 2025

(54) DIGITAL APPRAISAL SYSTEM PROVIDING COMPUTATIONAL ATTESTATION OF APPRAISAL INTEGRITY

(71) Applicant: Digipraise LLC, Miami Beach, FL (US)

(72) Inventor: Alison Heiss McLaney, Miami Beach, FL (US)

(73) Assignee: DIGIPRAISE LLC, Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,721

(22) Filed: May 3, 2023

(65) Prior Publication Data
US 2023/0394505 A1    Dec. 7, 2023

Related U.S. Application Data

(63) Continuation of application No. 17/359,050, filed on Jun. 25, 2021, now Pat. No. 11,682,025.

(Continued)

(51) Int. Cl.
*G06Q 30/018* (2023.01)
*G06F 16/28* (2019.01)
(Continued)

(52) U.S. Cl.
CPC ....... *G06Q 30/0185* (2013.01); *G06F 16/285* (2019.01); *G06N 20/00* (2019.01);
(Continued)

(58) Field of Classification Search
CPC .......... G06Q 30/0185; G06Q 20/3674; G06Q 20/389; G06Q 30/0278; G06Q 40/08;
(Continued)

(56) References Cited

U.S. PATENT DOCUMENTS 11,682,025 B2    6/2023  McLaney
2001/0034694 A1 * 10/2001  Elias ...................... G06Q 40/04
                                                          705/37

(Continued)

FOREIGN PATENT DOCUMENTS

CA          3134192 A1 *  4/2022  ............. G06N 20/00
WO       2020/092900 A2    5/2020

OTHER PUBLICATIONS

Singer, Can Blockchain Save Insurance (Year: 2021).*
(Continued)

*Primary Examiner* — Richard C Weisberger
(74) *Attorney, Agent, or Firm* — Hamilton, Brook, Smith & Reynolds, P.C.

(57) ABSTRACT

Systems and methods are disclosed for providing a virtual updated appraisal of a valuable asset without an onsite inspection. The appraisal system may provide attestation of the integrity of the updated appraisal generated by verifying the asset through video and image capture transmissions and geolocation data extracted from the transmissions. The updated appraisal may be configured as self-authenticating and recorded in a transaction on a blockchain, accessible via a QR code image. The updated appraisal may be stored in a blockchain wallet and configured as a non-fungible token. The geolocation data can enables the appraisal system to verify the integrity of the submission and thereby reduces (Continued)

the chance of fraud. In this way, updated appraisals generated by the system can increase confidence for insurance companies as to the authenticity and accuracy of the updated appraisal.

20 Claims, 14 Drawing Sheets

Related U.S. Application Data

(60) Provisional application No. 63/044,789, filed on Jun. 26, 2020.

(51) Int. Cl.
| | |
|---|---|
| G06N 20/00 | (2019.01) |
| G06Q 20/36 | (2012.01) |
| G06Q 20/38 | (2012.01) |
| G06Q 30/02 | (2023.01) |
| G06Q 40/08 | (2012.01) |
| H04L 9/40 | (2022.01) |
| H04L 67/01 | (2022.01) |
| H04L 67/52 | (2022.01) |
| G06V 20/62 | (2022.01) |
| H04L 67/104 | (2022.01) |

(52) U.S. Cl.
CPC ....... *G06Q 20/3674* (2013.01); *G06Q 20/389* (2013.01); *G06Q 30/0278* (2013.01); *G06Q 40/08* (2013.01); *H04L 9/40* (2022.05); *H04L 67/01* (2022.05); *H04L 67/52* (2022.05); *G06V 20/62* (2022.01); *G06V 2201/10* (2022.01); *H04L 67/104* (2013.01)

(58) Field of Classification Search
CPC .. G06Q 20/409; G06Q 2220/00; G06Q 20/02; G06Q 20/3224; G06Q 20/3276; G06Q 20/38215; G06Q 20/401; G06Q 20/4015; G06Q 20/405; G06F 16/285; G06N 20/00; H04L 67/01; H04L 67/52; H04L 67/104; H04L 9/40; H04L 9/50; G06V 20/62; G06V 2201/10
USPC ...................................................... 705/3–44
See application file for complete search history.

(56) References Cited

U.S. PATENT DOCUMENTS

| | | | |
|---|---|---|---|
| 2006/0282342 A1* | 12/2006 | Chapman | G06Q 10/087 705/28 |
| 2007/0005480 A1* | 1/2007 | McDonald | G06Q 40/02 705/400 |
| 2010/0121769 A1* | 5/2010 | Yeko, Sr. | G07F 7/08 707/758 |
| 2011/0161117 A1* | 6/2011 | Busque | G06Q 10/10 382/307 |
| 2011/0243553 A1 | 10/2011 | Russell | |
| 2011/0313936 A1* | 12/2011 | Sieger | G06Q 10/083 705/306 |
| 2018/0025392 A1* | 1/2018 | Helstab | G06Q 10/10 705/306 |
| 2020/0111068 A1 | 4/2020 | Scarselli | |
| 2020/0184556 A1 | 6/2020 | Cella | |
| 2020/0234380 A1 | 7/2020 | Dulori | |
| 2021/0082044 A1 | 3/2021 | Sliwka et al. | |
| 2021/0312561 A1 | 10/2021 | Speasl et al. | |
| 2021/0358032 A1 | 11/2021 | Cella et al. | |
| 2021/0406920 A1 | 12/2021 | McLaney | |

OTHER PUBLICATIONS

Consulting Project With the Topic: "Ageas Consulting Field Lab on a Cyber Risk Value Proposition" (Year 2021).*

Demarco, "Building Relationships online: how three jewelers are using the Internet to personalize their businesses, educate consumers and attract customers from outside their regions", Jewelers Circular Keystone 175.7:106(4), Reed Business Information, Inc. (US), Jul. 2004.

Swango, "The Appraiser's Tool Kit-Then, Now and Coming", The Appraisal Journal 75.3: 279-294: Appraisal institute, Summer. (Year: 2007).

Non-Final Office Action for U.S. Appl. No. 17/359,050, titled "Digital Appraisal System Providing Computational Attestation of Appraisal Integrity," Dated Sep. 29, 2022 consisting of 9 pages.

Notice of Allowance for U.S. Appl. No. 17/359,050, titled "Digital Appraisal System Providing Computational Attestation of Appraisal Integrity," Dated Mar. 16, 2023 consisting of 10 pages.

* cited by examiner

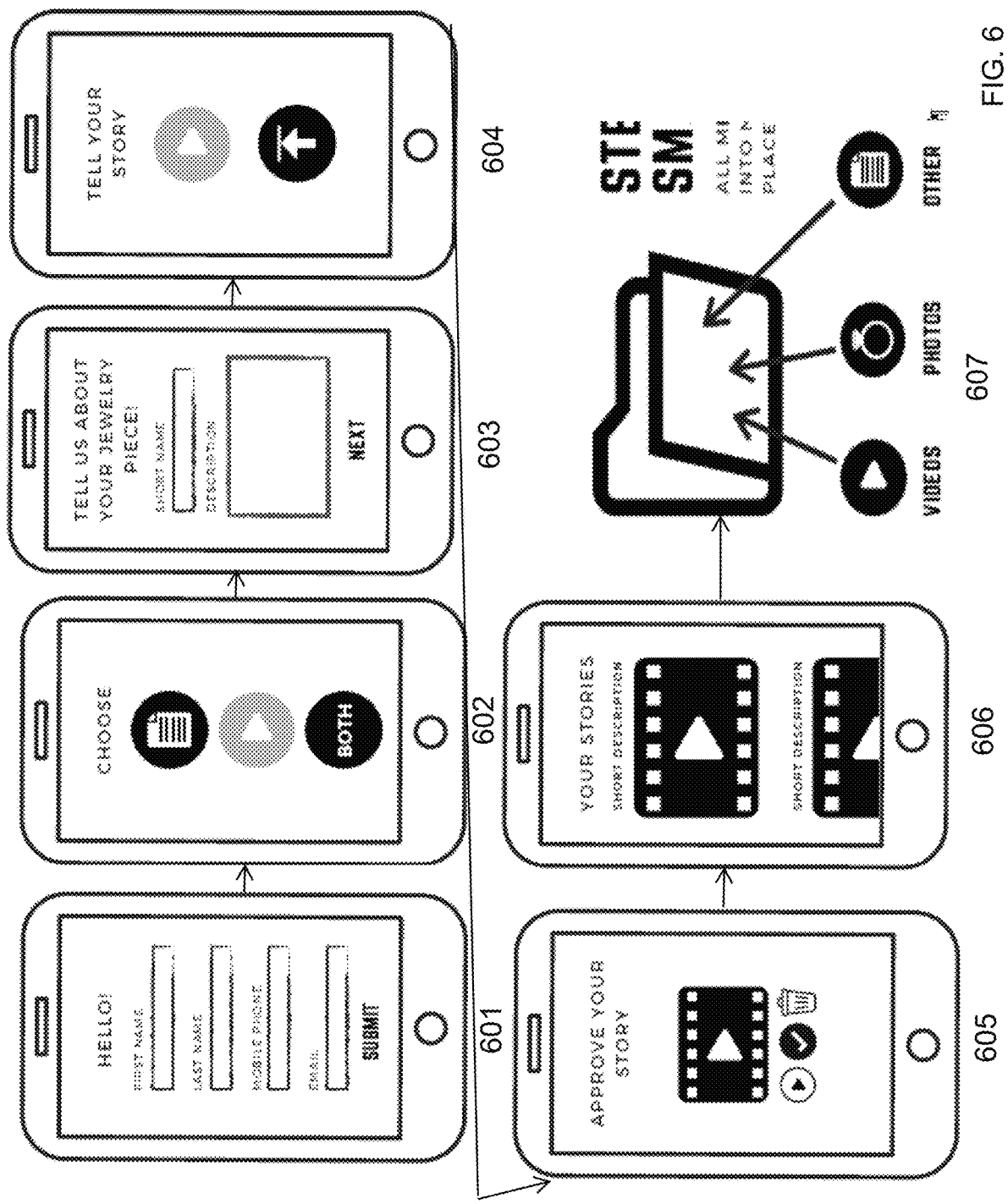

DIGITAL APPRAISAL SYSTEM PROVIDING COMPUTATIONAL ATTESTATION OF APPRAISAL INTEGRITY

RELATED APPLICATIONS

This application is a continuation of U.S. application Ser. No. 17/359,050, filed on Jun. 25, 2021, which claims the benefit of U.S. Provisional Application No. 63/044,789, filed on Jun. 26, 2020. The entire teachings of the above applications are incorporated herein by reference.

BACKGROUND

An appraisal is a measured assessment of the valuation of property. The property can be any type of asset, such as real property or intellectual property. Examples of real property may include jewelry, art, collectibles, antiques, businesses, real-estate. Examples of intellectual property may be digital assets, digital art, crypto-art, non-fungible tokens, patents, trademarks, copyrights, trade secrets, or skins. Appraisals are often used for insurance, underwriters and taxation purposes or to determine a possible selling price for an item or property.

SUMMARY

Appraisals are often obtained at the time an asset is purchased or inherited. If the owner of the asset chooses to insure the asset, they provide a copy of the appraisal to their insurance agent or insurance carrier. Typically, appraisals are not updated. As time passes, the value of asset may increase or decrease in value, and it may be desirable to have the appraisal updated. Some insurance companies, for example, do not automatically increase the value of insured asset without receiving an updated appraisal. Thus, once market prices increase, the owner of the asset might be underinsured unless they have an updated appraisal.

As it relates to jewelry, to obtain an updated value, in some cases, the owner of the jewelry would visit a jeweler or an appraiser who can physically inspect the item and complete an on-site appraisal. Due to the time, effort and cost associated with an on-site appraisal, many people do not obtain such updates.

Often, with conventional appraisals, a valuator initiates an entirely new appraisal. Further, it can be a burden to secure such a new appraisal because on-site inspection is often needed.

Example embodiments of present disclosure can address such issues by creating an appraisal system that is configured to computationally generate an updated appraisal and provided automated attestation of the updated appraisal without, for example, an onsite inspection. An updated digital appraisal can be computationally generated to bring forward the effective date of the existing appraisal virtually in real-time. Rather than duplicating the steps in the appraisal process, embodiments of the disclosed appraisal system can assess whether information from the existing appraisal is still reasonably reliable. In some cases, a recertification of value (or ROV), e.g. updated appraisal may be issued by the system.

Aspects of the disclosure include an appraisal system that issues updated appraisals. The system can provide owners of valuable assets a simple and contactless way to obtain an expert valuation update to their existing appraisal based on current market prices. With the disclosed appraisal system, valuators can work safely and remotely in a virtual format, versus the traditional option of a brick and mortar presence.

Due to the fact that the appraisal industry is self-governing, and that anyone can write an appraisal, without needing credentials, there are many poorly written appraisals in circulation. Owners of jewelry count on these appraisals to be sufficient for a future jeweler to use to recreate the item if it is lost/stolen. Unfortunately, a poorly written appraisal, missing key gemological details, prohibits the recreation and leaves the owner of the item devastated that it cannot be recreated.

In some embodiments of the disclosed appraisal system, such defective appraisals may be resolved by providing an updated appraisal using the disclosed appraisal system that cures the defects, without, for example, having an onsite inspection.

According to an embodiment, an existing appraisal of an asset is submitted with image capture. The system requests image capture of the asset, as well as video capture. The system uses OCR to convert the existing appraisal into text to allow the system to process the existing description and determine a current value. The image and video capture of the asset confirms the user is in possession of the asset by using data points in the metadata. An updated appraisal is generated and stored securely on the cloud for future access and the client is provided with a unique QR code for reference and easy access to their appraisal. In this way, owners of assets of value may be able to update the valuation of the asset remotely, without the need to visit an appraiser in person, or without the need to manually type out the item's description to an online appraisal service.

In some embodiments, an updated appraisal that is computationally generated by the disclosed appraisal system can be used to prove physical possession, for example, a fraud detector/deterrent for the insurance industry. To prove the user is in possession of the asset, submission of evidence, such as a photograph, may be secured, authenticated, anonymized, and geofenced. For example, the disclosed appraisal system may strip metadata from the digital image and confirm the existence of the asset through geolocation, owner of the user device generating the image, owner of the camera, thus, mitigating onsite inspection. The disclosed appraisal system may use machine learning algorithms, such as digital image manipulation detection algorithms, to detect if the digital image of the asset has been altered. For example, digital image manipulation detection algorithms may be used by the system to computationally process the digital image for unsightly fuzzy sections and colors fringing on hard edges. The system can detect if the image has been altered if unsightly artifacts often appear right along the edge of the digital image.

According to an embodiment, a computer-implemented method and system are provided that computationally create an updated digital appraisal using a blockchain communication network. A client device is accessed by an appraisal server system in preparation for creating a virtual appraisal of an asset. The client device is paired with an appraisal server. The geolocation of the client device is determined. A secure connection with the client device is created to enable a secure image capture of a prior appraisal of the asset. An internal validation of the integrity of the image capture of the prior appraisal is computationally parsed using extracted data and metadata from the image capture of the prior appraisal. A transmission from the client device of an image capture of the asset is computationally processed. A transmission from the client device of a video capture of the asset is computationally processed. Geolocation data associated with (i) the image of the prior appraisal, (ii) the image capture of the asset, and (iii) the video capture of the asset are determined. If the geolocation of the (i) the image of the prior appraisal, (ii) the image capture of the asset, and (iii) the video capture of the asset substantially match, the authenticity of the submission is established. In response, an updated virtual appraisal of the asset is generated using (i) the extracted data and metadata of the captured image of the prior appraisal, (ii) the image capture of the asset, and (iii) the video capture of the asset.

In one embodiment, the digital appraisal system/method include an electronic wallet storing a copy of the updated appraisal, the updated appraisal being configured as a non-fungible token. The electronic wallet is configured to enable access to the updated appraisal via a QR code image. The electronic wallet may include a plurality of updated appraisals, and each ow which may be separately configured as respective non-fungible tokens. The plurality of updated appraisals are bound into a ring, such that they are interchangeably accessible to a third party service provider on behalf of a user of the client device. The third party service provider may be an underwriter or an insurance company.

The appraisal server may process the captured prior appraisal image to detect for alterations using digital image manipulation detection algorithms. The electronic wallet may include a plurality of videos detailing historical data about the asset.

In one embodiment, if the submission integrity is verified, an instruction may be transmitted to the blockchain network for recording the updated appraisal, such that at least a portion of the blockchain network responds by requiring multiple electronic signatures in order to accept an electronic blockchain transaction recording the digital appraisal. In this embodiment, a first electronic signature corresponds to the processing of the updated appraisal, such that a verification of the integrity of the signature is applied to the blockchain transaction. The system responds to the first electronic signature by verifying the integrity of the signature.

In an embodiment, the client device receives a QR code from the appraisal server to access the updated appraisal. In an embodiment, the client device receives a QR code from the appraisal server to access the updated appraisal and a plurality of other updated appraisals.

In an embodiment, a parser computationally parses and indexes the extracted index text data and metadata from the image capture of the prior appraisal. In an embodiment, the machine learning engine compares the extracted, indexed data and metadata from the image capture of the prior appraisal with a corpus of data including a plurality of other appraisals. A classifier may classify the extracted, indexed data and metadata from the image capture of the prior appraisal based on the comparison with the corpus of data. The updated appraisal may be generated based on the classifying using machine learning and artificial intelligence algorithms.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6 is an example interface flow illustrating an asset story attestation.

DETAILED DESCRIPTION

A description of example embodiments of the disclosure follows.

Some embodiments of the disclosure relate to a digital appraisal system. The digital appraisal system may include systems and methods for asset value attestation. In some embodiments, automation of virtual appraisal of an asset and integrity verification of that virtual appraisal are provided. In some embodiments, attestation of stories or history of an asset implementations are provided.

Digital Processing Environment

Figure 1A:
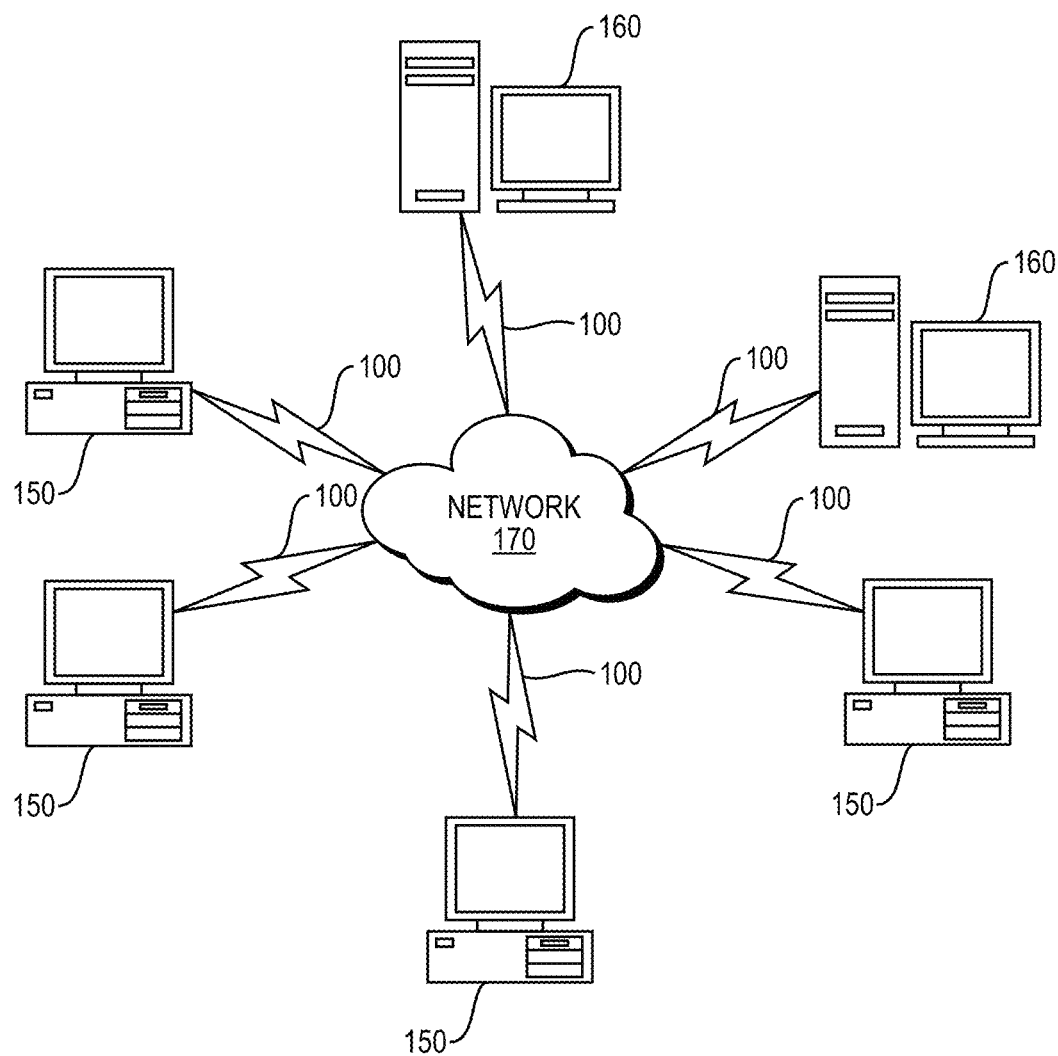
FIG. 1A is an example digital processing environment in which embodiments of the may be implemented.

An example implementation of a digital appraisal system 100 may be implemented in a software, firmware, or hardware environment. FIG. 1A illustrates one such example digital processing environment in which embodiments may be implemented. Client computers/devices 150 and server computers/devices 160 (or a cloud network 170) provide processing, storage, and input/output devices executing application programs and the like.

Client computers/devices 150 may be linked directly or through communications network 170 to other computing devices, including other client computers/devices 150 and server computer/devices 160. The communication network 170 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another. The communication network 170 may also be a virtual private network (VPN) or an out-of-band network or both. The communication network 170 may take a variety of forms, including, but not limited to, a data network, voice network (e.g. land-line, mobile, etc.), audio network, video network, satellite network, radio network, and pager network. Other electronic device/computer networks architectures are also suitable.

Server computers 160 may be configured to provide a user device appraisal system 100 which communicates with authenticators to confirm a requestor's identity prior to allowing the requestor to access resources protected by the appraisal system. The server computers may not be separate server computers but part of cloud network 170.

Figure 1B:
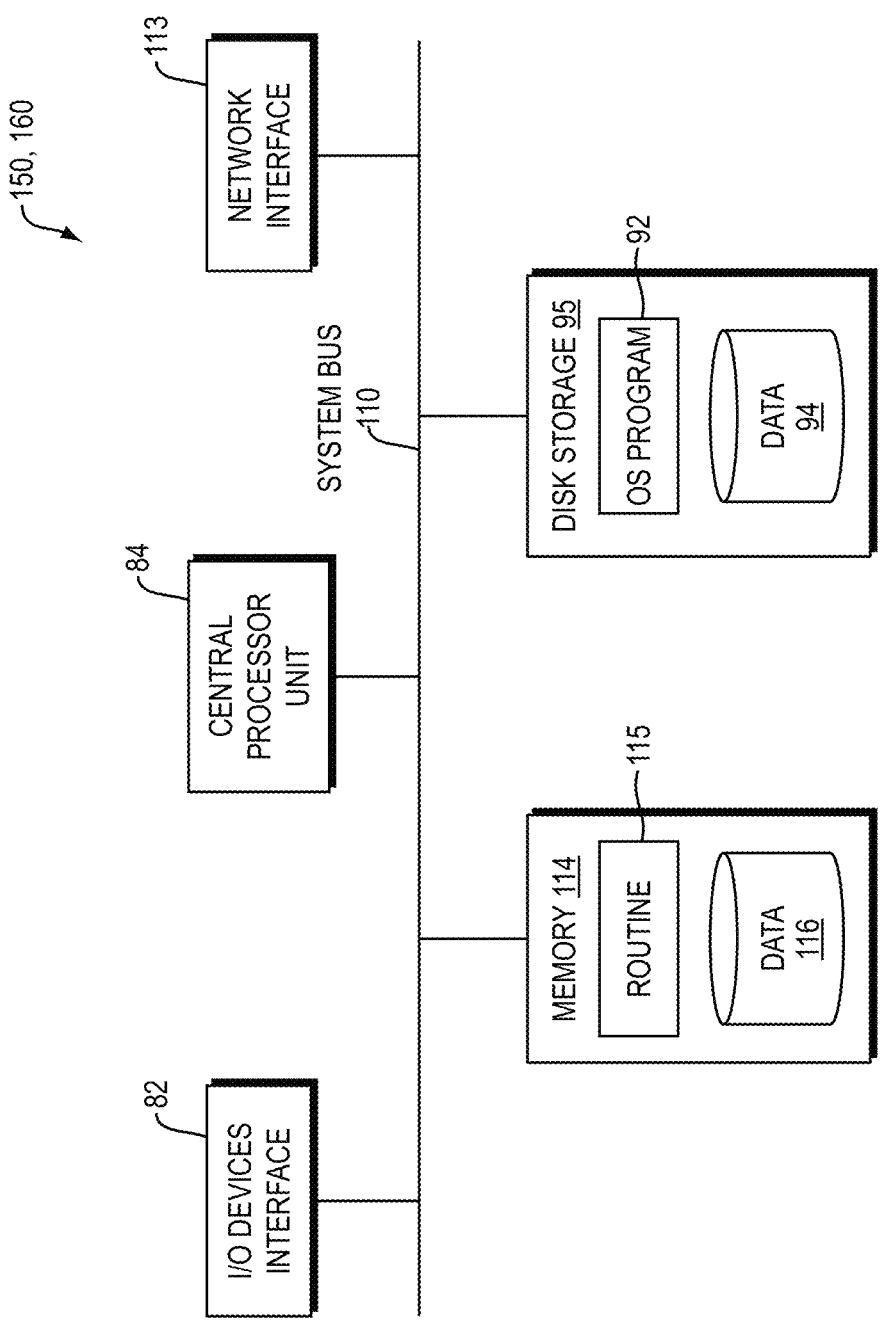
FIG. 1B is a block diagram of any internal structure of a computer/computing node.

FIG. 1B is a block diagram of any internal structure of a computer/computing node (e.g., client processor/device 150 or server computers 160) in the processing environment of FIG. 1A, which may be used to facilitate displaying audio, image, video or data signal information. Each computer 150, 160 in FIG. 1B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 1A). Memory 114 provides volatile storage for computer software instructions 115 and data 116 used to implement software implementations of digital appraisal including its creation, authentication, and attestation, recordation on the blockchain, and storage in a smart wallet. Such digital appraisal generation, attestation, authentication software and smart wallet components 115, 116 of the digital appraisal system 100 (200 of FIG. 2B) described herein may be configured using any programming language, including any high-level, object-oriented programming language, such as Python.

In an example mobile implementation, a mobile agent implementation may be provided 208. A client server environment can be used to enable mobile security services using the server 190. It can use, for example, the XMPP protocol to tether a device appraisal engine/agent/app 115, 208 on the device 150 to a server 160. The server 160 can then issue commands to the mobile phone on request. The mobile user interface framework to access certain components of the appraisal system 100 may be based on XHP, Javelin and WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language.

The appraisal system 100 may also include instances of server processes on the server computers 160 of the appraisal service provider that may comprise an encoder 210, appraisal engine/service provider valuator app 240a (FIG. 2A, 2B), which enables computationally generated digital appraisals. The appraisal system 100, 200 which allows registering a user, authenticating a user, confirming a user's identify, creating a digital appraisal, performing analytics, digital forensics, and image/video alteration algorithms on digital images and videos received from the requestor to confirm the authenticity of the digital images/videos, executing a transition on a blockchain network to record an updated appraisal, generating a token/smart contract associated with the updated appraisal, providing fraud detection, enabling a network of third party systems 281, such as insurance and underwriters, to communicate and user the appraisal system 100, 200 and executing algorithms, such as statistical algorithms to compute confidence scores associated with appraisals. FIG. 4A-4D show examples of generating a digital appraisal according to an embodiment.

Figure 4A:
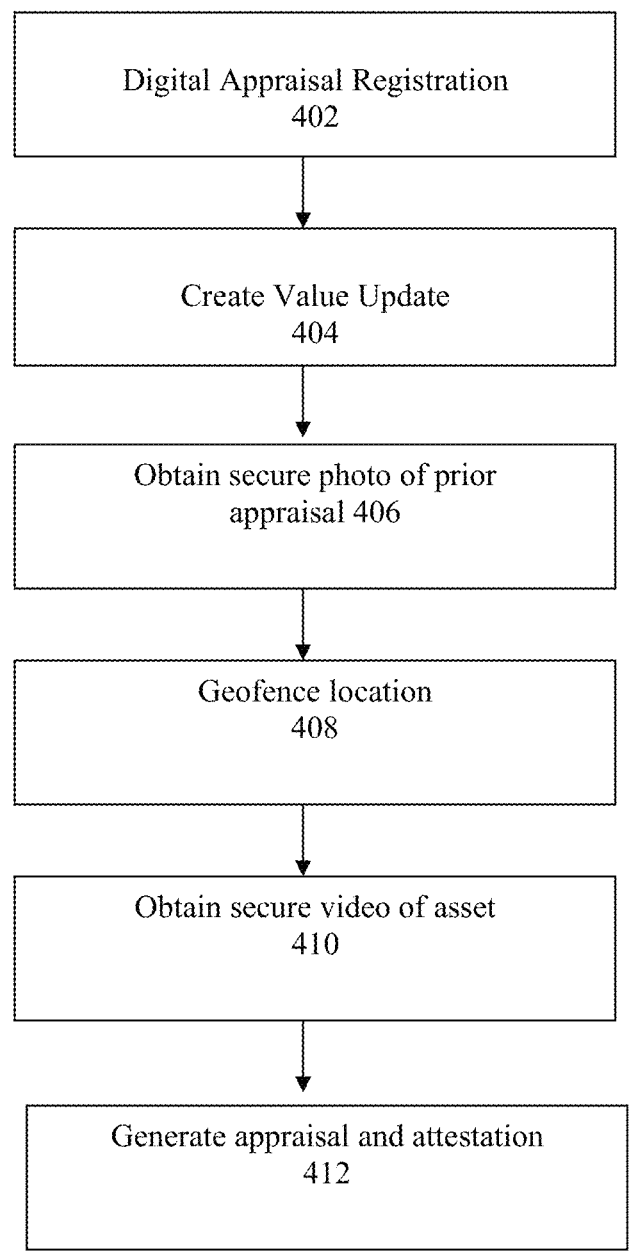
FIG. 4A-4D show examples of generating a digital appraisal according to an embodiment.
Figure 4B:
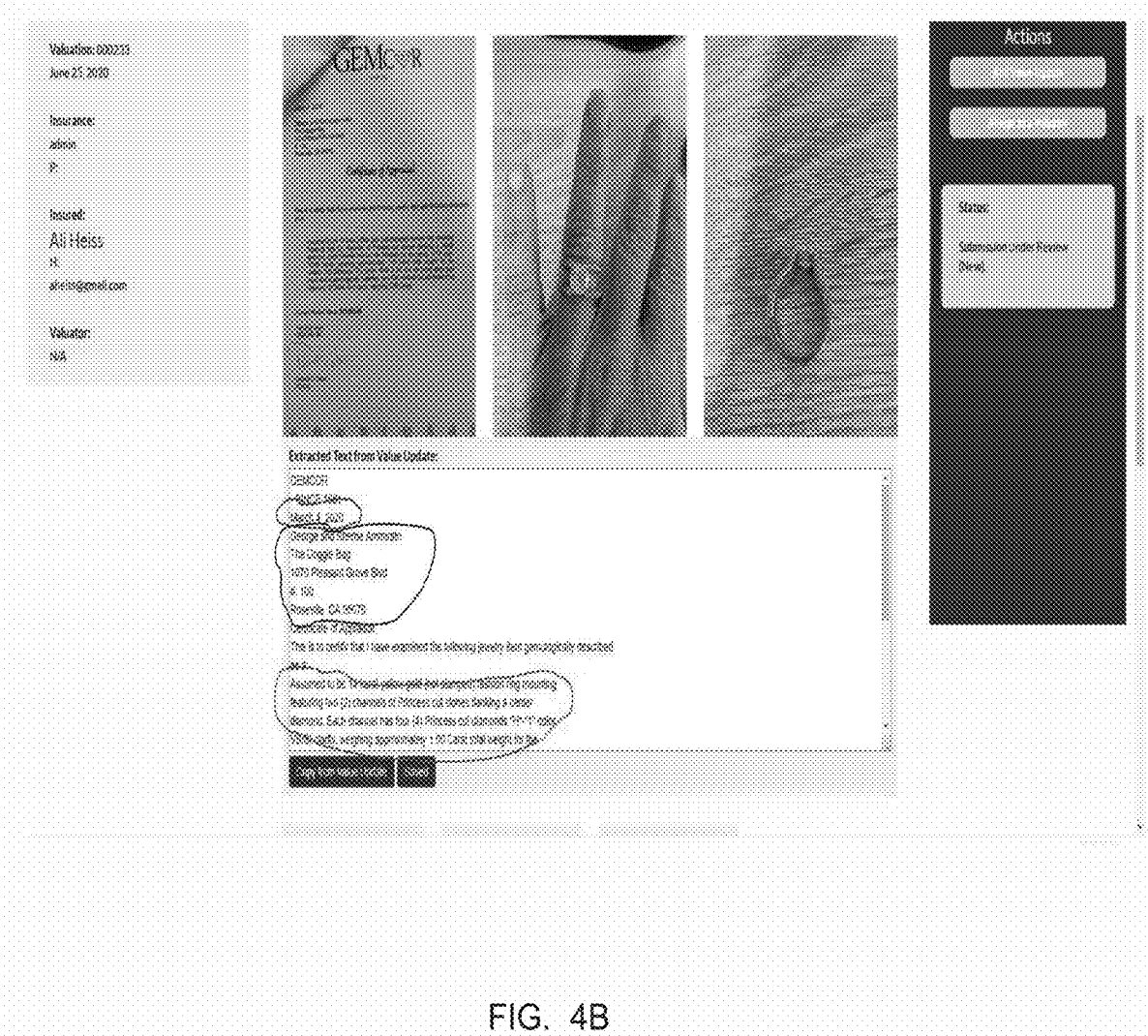
Figure 4C:
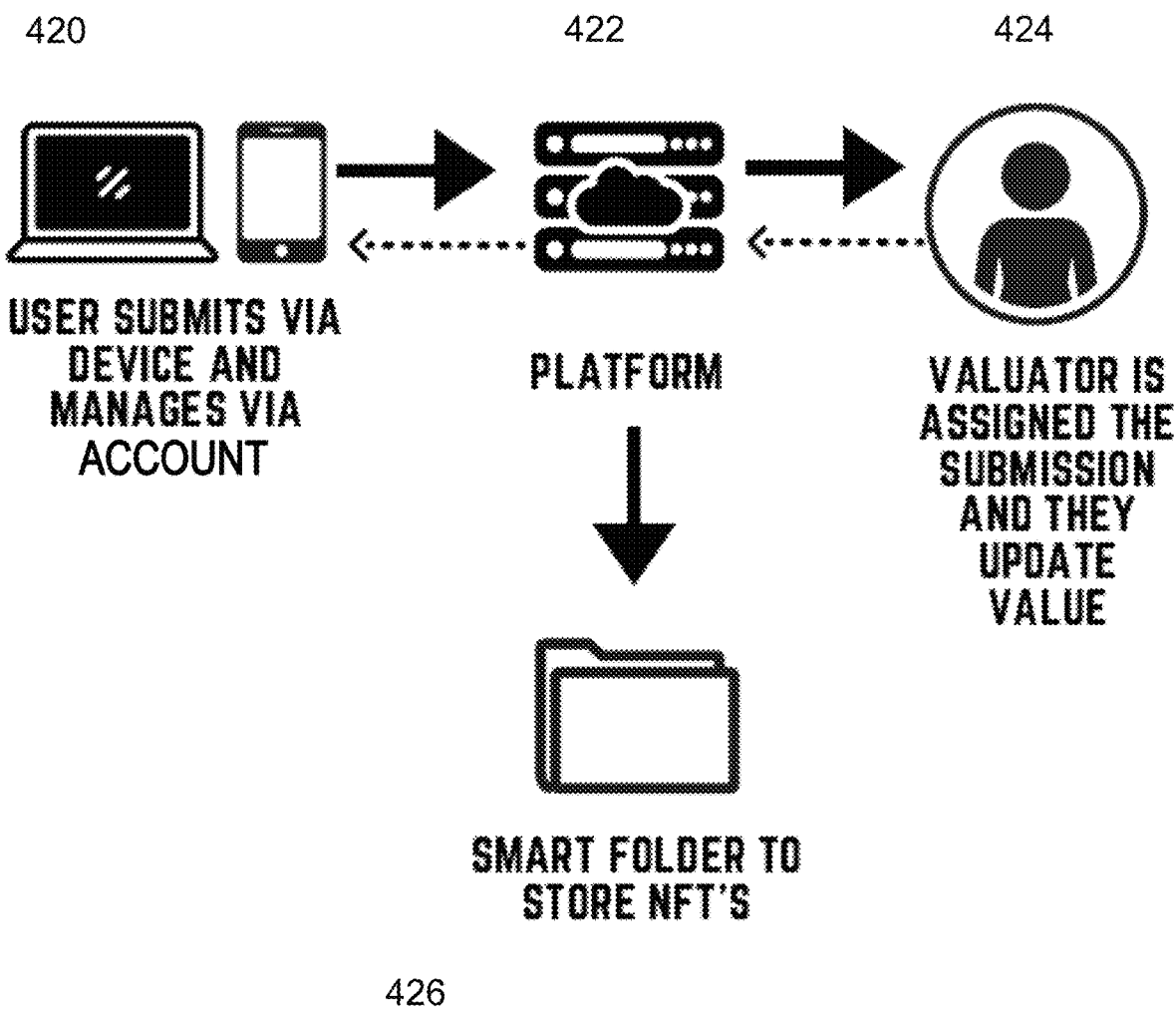
Figure 4D:
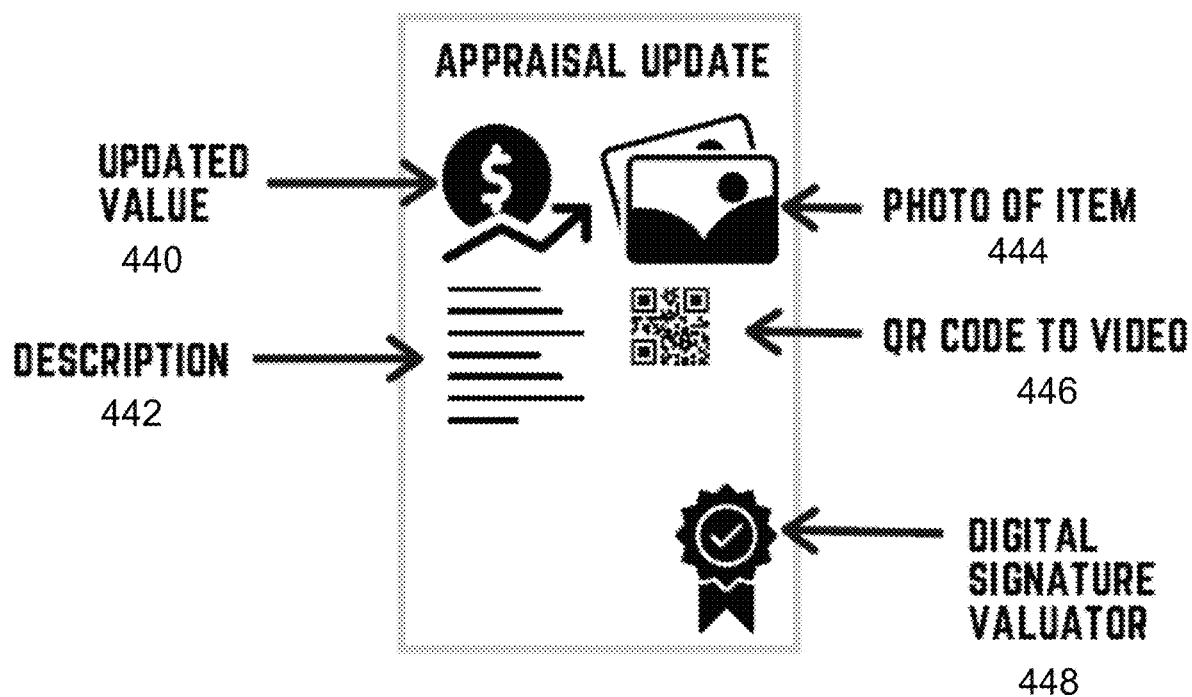

According to an embodiment of FIG. 4D, an existing appraisal of an asset is submitted with image capture 444. The appraisal engine/service provider valuator app 240 requests image capture of the asset, as well as video capture. The appraisal engine/service provider valuator app 240 uses an OCR API 442 to convert the existing appraisal into text (see FIG. 4B) to allow the appraisal engine/service provider valuator app 240 to process the existing description using machine learning and determine a current value 440. The image and video capture of the asset confirms the user is in possession of the asset by using data points in the metadata. An updated appraisal is generated by the appraisal engine/service provider valuator app 240 and stored securely on the cloud for future access and the client is provided with a unique QR code for reference and easy access to their appraisal. In this way, owners of assets of value may be able to update the valuation of the asset remotely, without the need to visit an appraiser in person, or without the need to manually type out the item's description to an online appraisal service. In some embodiments, the system 100 may enable story attestation associated with assets as in FIG. 6.

Disk storage 117 provides non-volatile storage for computer software instructions 115 (equivalently "OS program") and data 116 used to implement embodiments of the appraisal system 100. The appraisal system may include disk storage accessible to the server computer 160. The server computer can maintain secure access to records related to the authentication of users registered with the appraisal system 100. Central processor unit 112 is also attached to the system bus 110 and provides for the execution of computer instructions.

In an example embodiment, the processor routines 115 and data 116 are computer program products. For example, if aspects of the digital appraisal system 100 may include both server side and client side components.

In an example embodiment, users and authenticators/attesters to attest to the identity of the user and authenticity of original appraisal, insurance agents, and client devices of members of a group associated with story attestation assets as in FIG. 6 may be contacted via instant messaging applications, video conferencing systems, VOIP systems, email systems, etc., all of which may be implemented, at least in part, in software 115, 116. In another example embodiment, the digital appraisal engine/agent may be implemented as an application program interface (API), executable software component, or integrated component of the OS configured to authenticate users on a Trusted Platform Module (TPM) executing on a computing device 150.

Software implementations 115, 116 may be implemented as a computer readable medium capable of being stored on a storage device 117, which provides at least a portion of the software instructions for the appraisal system 100. Executing instances of respective software components of the appraisal system 100, such as instances of the appraisal engine, may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g. a radio wave, an infrared wave, a laser wave, a sound wave, or an electrical wave propagated over a global network such as the Internet, or other networks. Such carrier medium or signal provides at least a portion of the software instructions for the digital appraisal system 100 of FIG. 2A.

Certain aspects of the system 200 enable trust in digital appraisals. Some embodiments may provide authentication of the user, geolocation verification, device verification, and fraud detection components. Some embodiments operate on the fundamental premise that a reliable relationship with a device can make for a much safer, easier and stronger relationship with an end user. Achieving this requires knowing with confidence that a device involved in a digital appraisal is the same device it was in previous digital appraisals. It also requires assurance that a device will not leak protected information if it is requested to perform sensitive operations such as decryption or signing the digital appraisal transaction.

Digital Appraisal Generation and Attestation

Figure 2A:
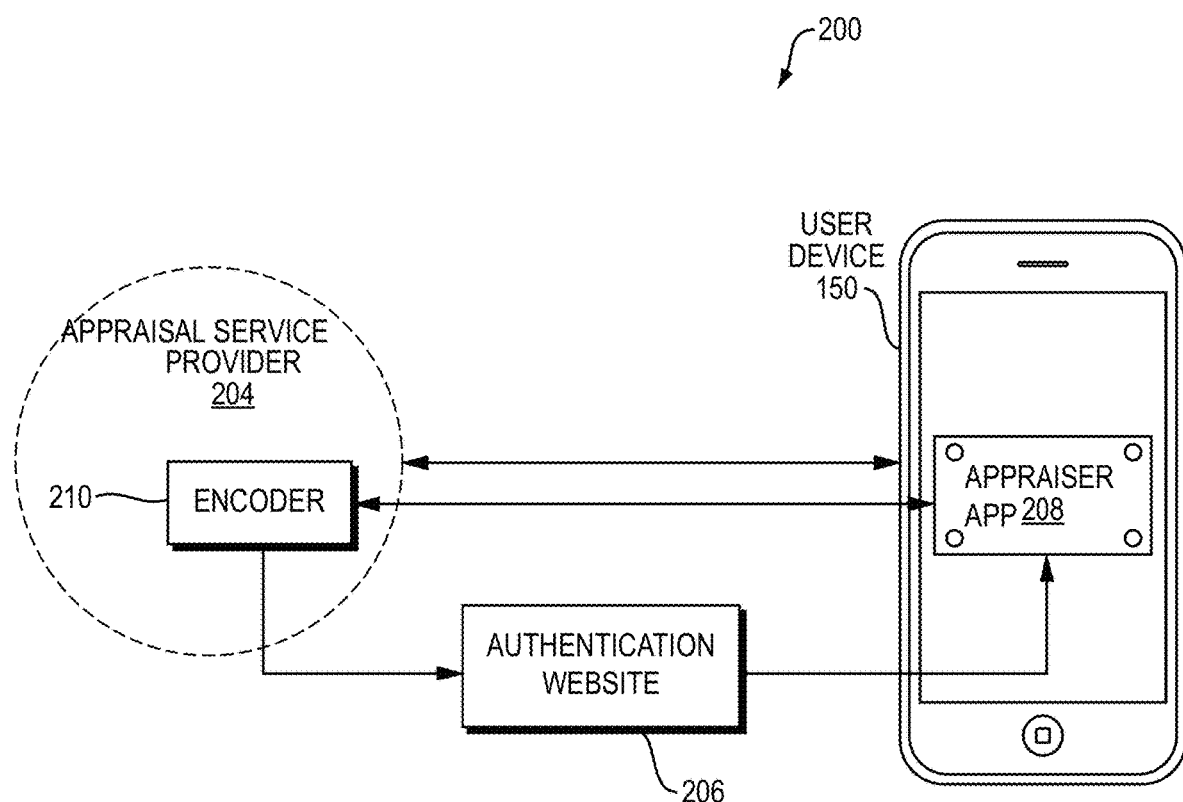
FIG. 2A is a block diagram showing an example device appraisal system according to the invention.

FIG. 2A is a block diagram showing an example appraisal system according to an embodiment, with components 200. With example appraisal system components 200, web developers and app developers can make use of hardened encryption and identity keys in endpoint user device s 150 through an application program interface (API). In addition, further services may be provided built on these system components 200 for image and video capture/management, attestation, token/smart contract management etc. To support this system, for example, the registration of identity keys and a set of device management services for updated appraisal generation, image and video capture and authentication, updated appraisal attestation, smart contract/token/NFT generation, recordation of the updated appraisal on the blockchain, backup and device grouping, may be managed.

According to an embodiment of FIG. 4D, an existing appraisal of an asset is submitted with image capture. The system requests image capture of the asset, as well as video capture. The system uses OCR to convert the existing appraisal into text to allow the system to process the existing description and determine a current value. The image and video capture of the asset confirms the user is in possession of the asset by using data points in the metadata. An updated appraisal is generated and stored securely on the cloud for future access and the client is provided with a unique QR code for reference and easy access to their appraisal. In this way, owners of assets of value may be able to update the valuation of the asset remotely, without the need to visit an appraiser in person, or without the need to manually type out the item's description to an online appraisal service.

In one example embodiment, it would be the intent of the appraisal system to maintain mission critical data, including providing a platform for seamless yet very secure connections between third party systems, such as insurance computing systems 281, service providers 160, 204 and user device s 150. In one embodiment, the updated appraisals may be stored in an electronic vault system enabling third parties, such as insurance agents, to white label the system 200 as their own. On one end of the system may be an encoder 210 which prepares an instruction for a user device 150 and at the other is the appraisal applet 208 that can act on that instruction. A Protocol according to an embodiment defines how these instructions and replies are constructed.

The appraisal app 208 preferably embodies the innovative binding between the physical and digital works. The appraisal app 208 enables features of identity, transaction and attestation to the hardware of the device 150.

Figure 2B:
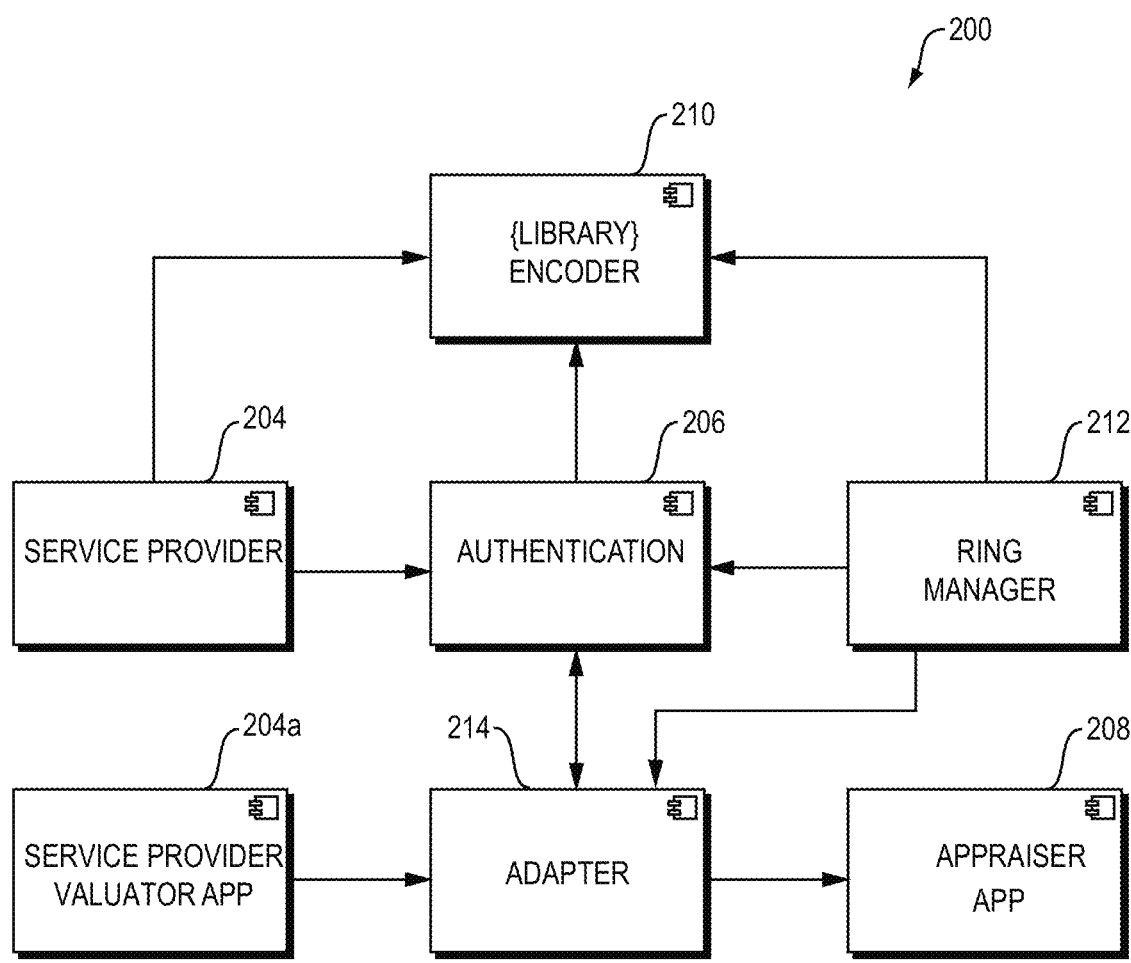
FIG. 2B is a diagram showing an example device appraisal system according to the invention.

The system 200, according to an embodiment shown in FIG. 2B, may use a secure socket to maintain a persistent connection with all devices. This channel is used for pairing and other administrative functions. Library code may be provided to service providers for simplifying the construction and signing of an instruction. This Library, for example, could be implemented in a programming language, such as an object-oriented, high-level programming language with dynamic semantics like Python.

The ring manager 212 can be implemented as a service provided to end-users for managing collections (or Rings) of appraisals. Appraisals may be grouped into a single identity and used to backup and endorse each other. In some preferred embodiments, the rings are a collection of individual device public keys (as opposed to a new key) to enable access and sharing and control of the collection of appraisals.

In a non-preferred example embodiment, a ring may be implemented as a shared private key on top of the unique private key of the device 150. It should be noted, however, it is not typical to share a "private key", nor would it be desirable to have a long-lived shared symmetric key.

One aspect of the appraisal system according to an embodiment registers a user device and equips it with a service provider's 204 keys. Inventive API's enable secure execution of a number of sensitive device-side transactions, including: getting a reliable and anonymous device id—on request, an embodiment will generate a signing key for a device for securely transmitting the original appraisal of an asset and a video of the asset. The public key is hashed into a string that can be used to identify and communicate with a device. Encryption and decryption is triggered locally and takes place within the secure execution environment so as to protect the key; creating an appraisal account—the device can be asked to generate a new appraisal account using the random number generator (RNG); signing an updated appraisal transaction—the device 150 can apply its private appraisal account key to sign a transaction and then return it to the service provider 204; securing confirmation. Certain embodiments enable multiple updated appraisals to be bound into a ring so they can interchangeably present themselves to an insurance service provider on behalf of the user.

An appraisal app 208 will respond to an instruction from a service provider 204 that has been "paired" with the device 150. The authentication website 206 conducts the pairing ceremony as it is able to confirm the integrity and identity of both device and the service provider. When a device 150 is paired it acquires the public key of the service provider 204, while the service provider gets a uniquely generated identity and public key for the device 150.

While the Third Party Agent/Process supports local calls, ideally all instructions are signed by the service provider 204. This protects a device key from being applied by a rogue application. An Encoder 210 is provided to help prepare and sign device instructions on the application server.

Appraisal Integrity Attestation

Embodiments may provide appraisal integrity attestation by automating the assurance of appraisal integrity against a known state as a signatory on a blockchain transaction. The appraisal system implemented by an embodiment is comprised of the several components shown in FIG. 2C. A device adapter 220 is a software service running on an endpoint device that provides an interface to a service provider 204 application and integrates with the device appraisal App 208. Another component, the device registrar 221 is a service that registers a device into the blockchain 222. A blockchain 222 is used both to store device registration and attributes and to execute transactions. There may be different blockchains. Another supporting component is a service provider 204 which is the application seeking to conduct an updated digital appraisal with a device. Trusted Application Manager (TAM) 223 authorized to cryptographically vouch for the provenance of the device 150.

Figure 2C:
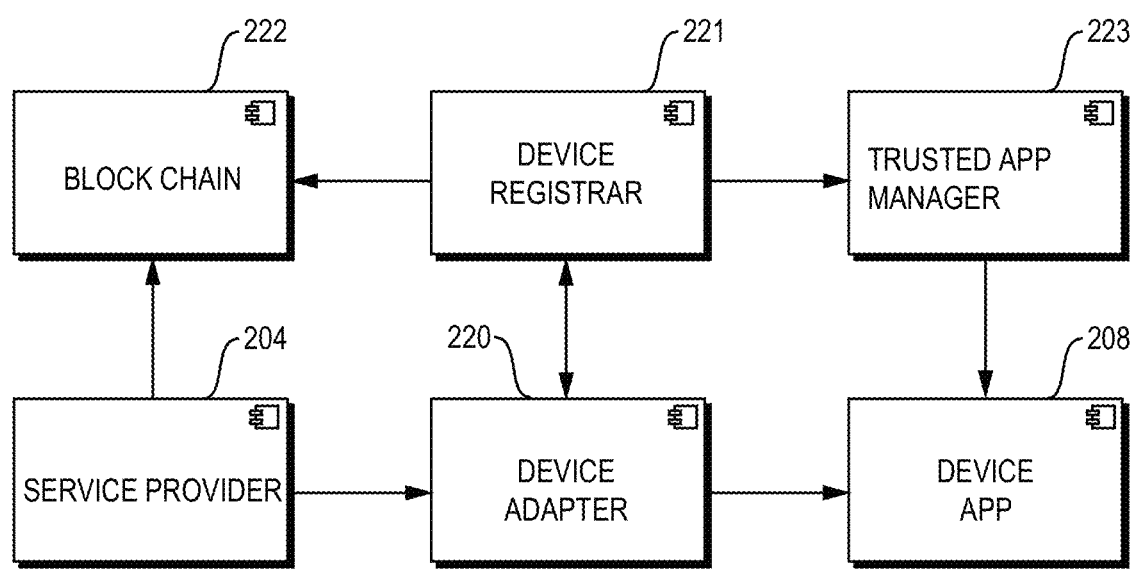
FIG. 2C is a diagram of the components of an embodiment of the invention.

According to an embodiment, when the device adapter 220 shown in FIG. 2C software runs for the first time it will ask the device appraisal app 208 to generate a public/private key pair as part of the registration of the user. The public key is signed by an endorsement key established during device manufacturing. This signed public key is sent to the device registrar 221 and validated with the TAM 223. Registration may involve confirmation from the device operator. This data set is posted into a public cryptographic ledger. The public record established cryptographic proof of the time of registration of the user along with the endorsement of the registrar. The registration may further include attribute data, such as geo location of the user device 150. The registration may reference a signed document that sets out the policy terms of the registrar at the time of registration. The device registrar 221, or another trusted integrity server, creates a blockchain account key (a public/private key pair) that can be referenced as a signatory in a multi-signature transaction on the blockchain. A signatory the value represented in the blockchain transaction cannot be spent or transferred unless co-signed by the Registrar.

Device Integrity Attestation—Authentication Website

In an example embodiment, authentication website 206 may be a JSON API written in Python, which uses the Third Party Agent/Process private key to enroll the identity keys of devices 150 and service providers 204. The result of pairing is that a user device 150 has a service public key, and can therefore respond to service provider 204 instructions.

The Protocol according to an embodiment specifies the structure of an instruction and the signing/encryption that must be applied for the device 150 to accept the instruction. The instruction itself may, for instance, be prepared as a C structure that contains the instruction code, version data and payload. The entire structure preferably is signed by the service provider key and delivered to the device appraisal applet 208 by calling a device local command.

Preferably, every user device 150 should present unique identity credentials. Devices 150 may join a ring so as to act as a singular entity on behalf of the user. In one embodiment, a device 150 can support group ID's that are locally stored as a list, but publicly translate into cross-platform authentication. In implementation, it can manifest in one or more diverse forms, which would be at least partially dictated by the basic capabilities across devices, hardware support and OS architecture.

Device Integrity Attestation—Appraisal System Adaptor

Figure 2D:
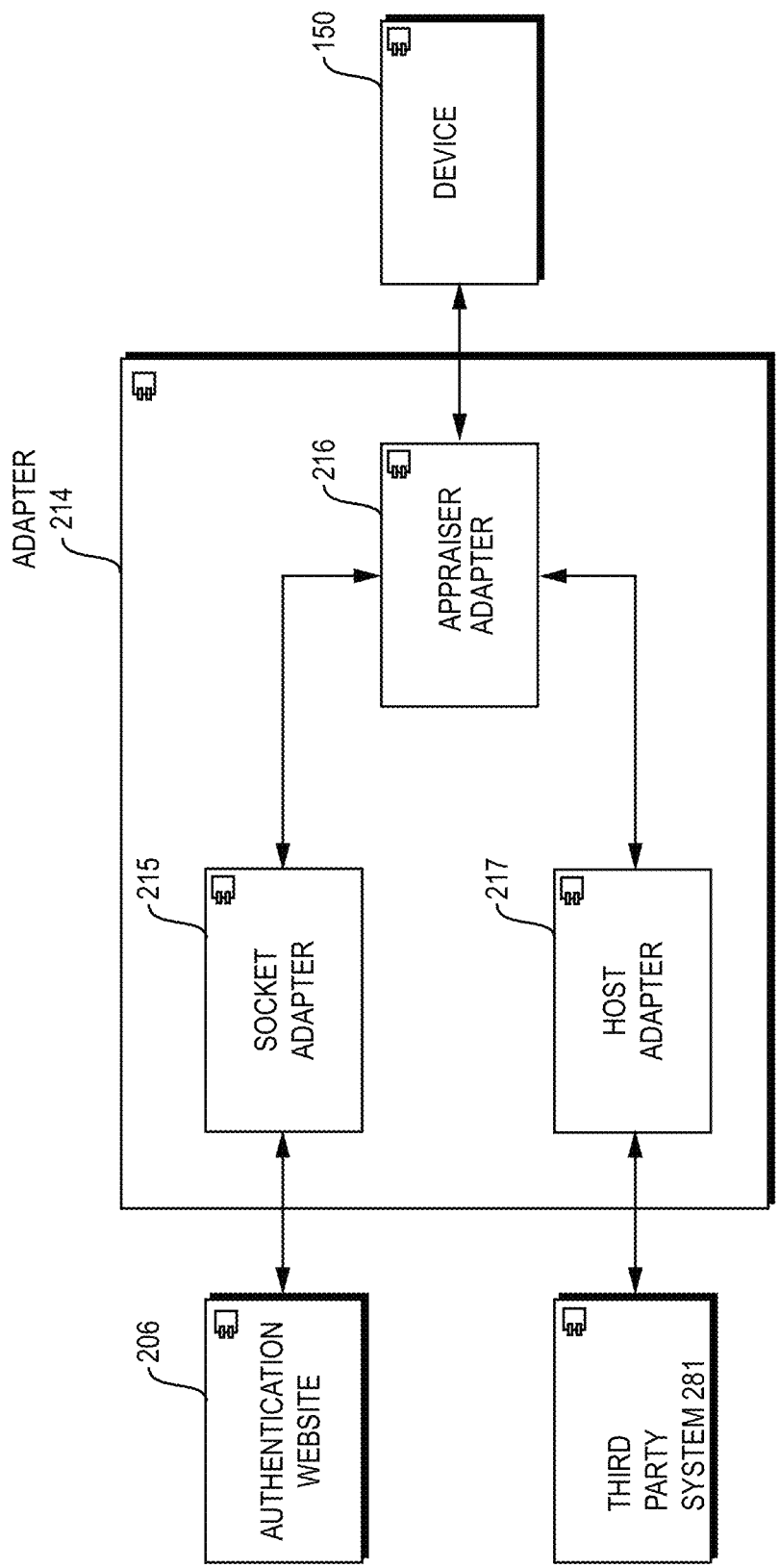
FIG. 2D is a diagram of the appraisal system adaptor and its outward and inward looking interfaces.

The Appraisal System Adaptor 214 is composed of outward and inward looking interfaces as shown in FIG. 2D. The inward looking interface, the appraiser adapter 216, handles proprietary communications with the Appraiser App 208. The Host Adaptor 217 is provided to expose services to third-party applications. The Host Adaptor 217 presents the interface of the Appraisal System Adaptor 214 through different local contexts, such as browsers or system services. Multiple realizations for diverse contexts are anticipated though initially this may be an Android service and a windows com process. The Socket Adaptor 215 connects the client environment authentication website 206. The Appraiser Adaptor 216 component is the proprietary glue that pipes commands into the Appraiser App 208. In an Android implementation the Appraiser Adaptor 214 may manifest as an Android NDK service app and may be configured to launch at boot. The Appraiser Adaptor 214 prepares message buffers that are piped to the device appraisal App 208 and then synchronously awaits notification of a response event. The Host Adaptor 217 is primarily there to isolate the appraiser adapter 216 from the host environment. The Host Adaptor 217 operates in a potentially hostile environment. There will therefore typically be limited assurance that the client has not been compromised. The Host Adaptor's role is therefore primarily to facilitate easy access to the device appraiser app 208. Instructions from a service provider 204 intended for the device appraiser app 208 will be signed by the service provider 204 and then passed through to the appraiser adapter 216 and device appraiser app 208.

Service Provider Registered to a Device

According to an example embodiment, the authentication website 206 is used to pair the service provider 160, 204 with the device 150 to enable registration of the device. The authentication website 206 has the special capability of being able to pair additional service providers with that device 150. Communications with the authentication website 206 may be handled through the web API and should be authenticated. In one example, this is implemented with an API key. In a preferred example embodiment, this is implemented using an SSL key swap. In some embodiments, all requests will be signed.

The relationship with devices may be dependent on being able to sign instructions with the private key. Such a private key is highly sensitive and is protected. Preferably, the private key is encased in an HSM.

In some embodiments, multiple keys are used, such that if one is compromised the whole system is not lost. This should, for example, should make it more difficult for an attacker to know which devices are connected with a compromised key. Furthermore, the appraisal system 200 is preferably in near constant contact with all devices 150 through the Socket Adapter 215 shown in FIG. 2C, which can facilitate frequent rotation of the keys.

The authentication website 206 may comprise several sub-components. A device ID is the unique identifier, in a UUID, assigned to a device by the authentication website 206 or other Registration Agent. An ephemeral pointer, device pointer, may be provided to a device 150 that can be requested by any local application. The device pointer can identify a current socket session to the authentication website 206 and therefore can be used to establish a device communication channel and to look up the permanent identifier, the device ID. The root of a device registration includes a unique, anonymous identifier, a registration date, a public key paired to a private key held in the device hardware and an endorsement signature from the Registration Agent. This information is recorded in the device registration record, which can be recorded on the blockchain.

Protocol for Securing Images and Video from the User Device

As shown in FIG. 4D, when an existing appraisal is updated 440, a photo of the existing appraisal and the item are secured. The appraisal description and metadata are extracted via OCR to prepare the updated appraisal. The user device 150 transmits a video capture of the asset to the service provider 160, 204. To facilitate this secure transmission, the device appraisal app 208 may interface with the encoder 210.

In one embodiment, the encoder 210 prepares a command to be executed by a specific device which is signed and/or encrypted by the service provider 204. The service provider public keys are preloaded into the device during a pairing process conducted by authentication website 206. This allows the device 150 to validate the origin of the video transmission request, and if needed decrypt the contents of the instruction.

Figure 3A:
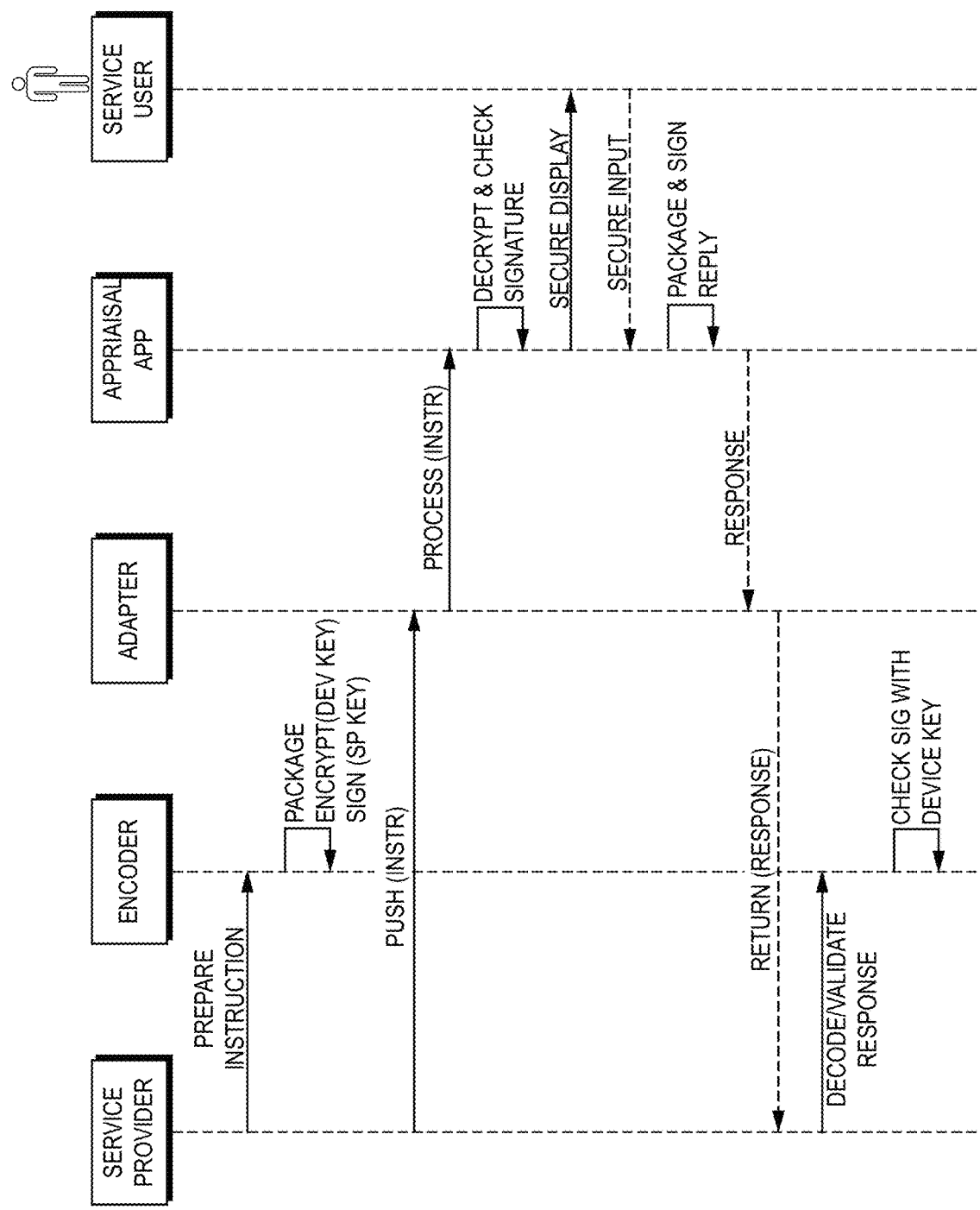
FIG. 3A is a diagram of the sequence of packaging and delivering an instruction by the service provider.
Figure 3B:
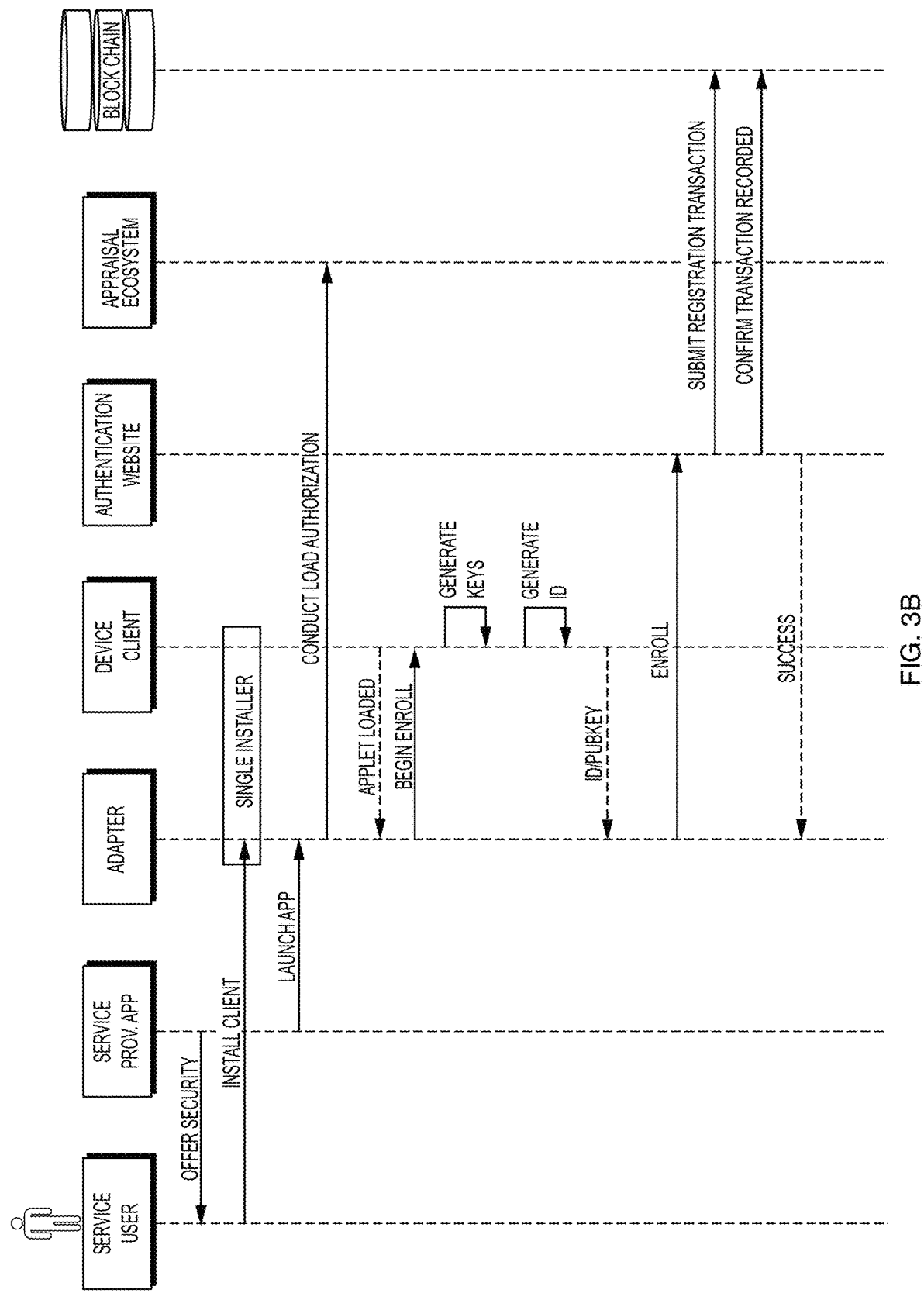
FIG. 3B is a diagram of the device enrollment process according to an embodiment.

The sequence of packaging and delivering an instruction is shown in FIG. 3A. The service provider 204 generates an instruction record with the help of the encoder 210 libraries. The instruction includes the type of media, the target device and payload. The instruction may be encoded with the device key and is signed by the service provider key. The device key is fetched from the authentication website 206, or directly from the blockchain, by looking up the device registration record.

Creating an Updated Appraisal on the Blockchain

Figure 5:
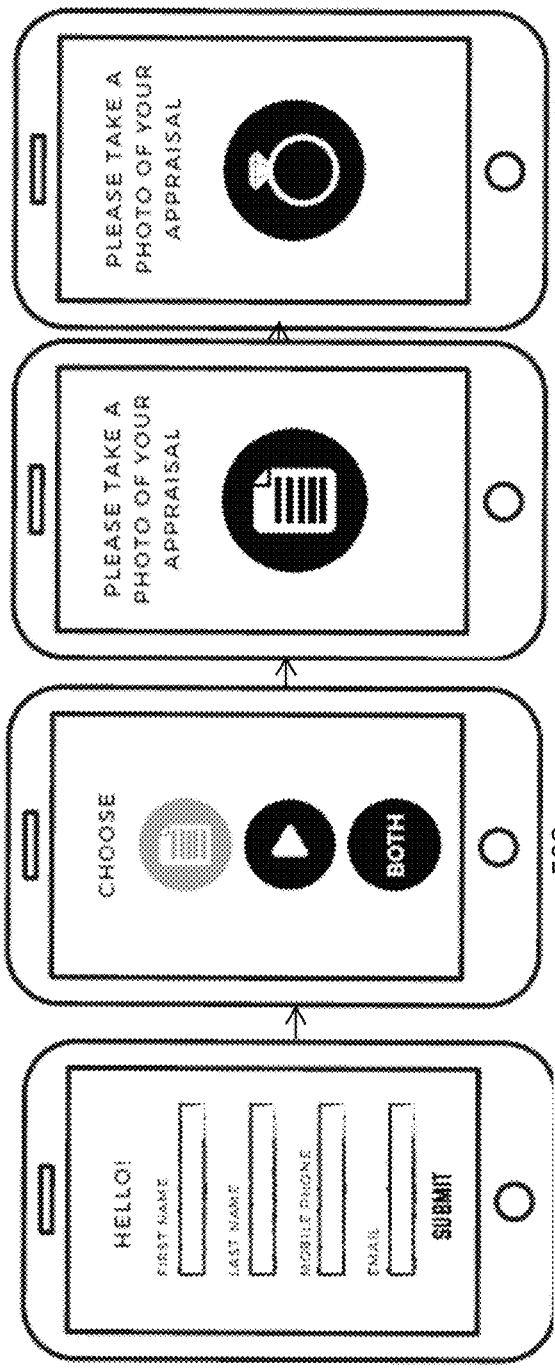
FIG. 5 is an example interface flow illustrating an appraisal value attestation update.
Figure 5:
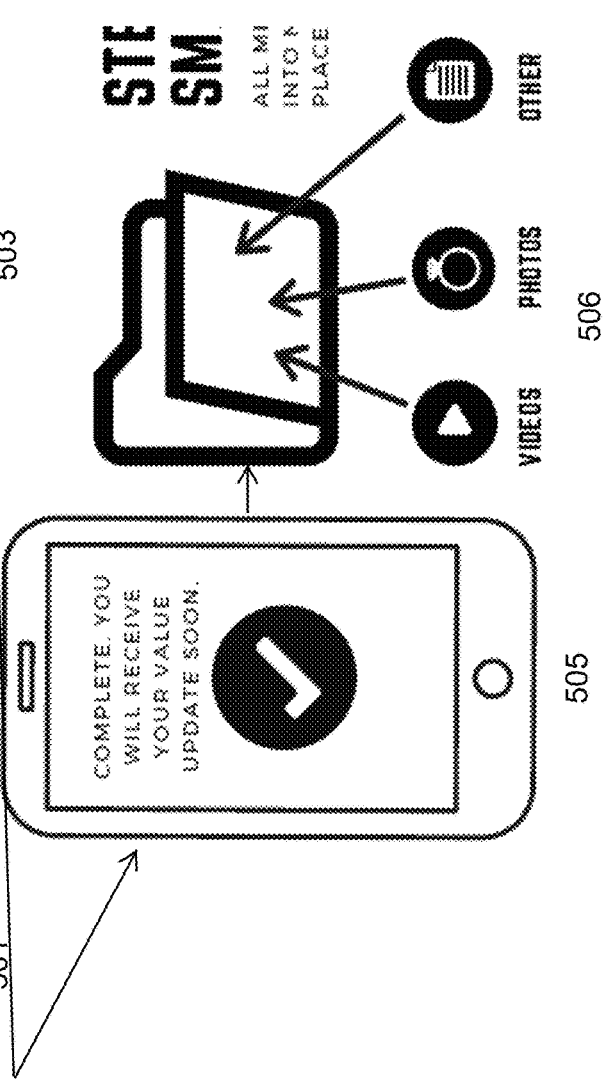

As shown in FIG. 5, to secure an updated appraisal, the system 200 registers the user at 501 securing the user's name, mobile phone, and email. This information is used to verify the identity of the user and create a secure account. The system 200 may create a socket layer connection with the user device to maintain a secure connection. Further, device enrollment or creation of a device registration record for a user device 150 on the blockchain may be used to help authenticate the device 150. Registration involves requesting from the device 150 its GPS Location. This data is signed by the device private key and may be further signed by the registrar 221. This data set is posted into a public cryptographic ledger of the blockchain. The public record established cryptographic proof of the time of registration along with the endorsement of the registrar. This system may match integrity measurements directly during appraisal processing using smart contract features built into a smart blockchain system such as that being developed by Ethereum.

As 502, 503, the system secures a photo of the existing appraisal to be updated. After the image is extracted, the system 200 will OCR the image text into editable text. This facilitates creating the appraisal update. After the image is extracted, its EXIF/metadata is extracted. This information will be used to further verify the user identify and verify that the appraised item is in their possession.

At 504, the system secures a photo of the appraised asset. After the digital image is received, its EXIF/metadata is extracted, which will be used to further verify the user's identify and confirm that the asset is in their possession. Data collected will include: date and time stamp, longitude/latitude, location, camera maker/model, camera lens, scene type, file name.

At 505, an appraisal engine/service provider valuator app 204a reviews, using artificial intelligence algorithms, the data extracted and the image and video capture submissions to assess authenticity and check for fraud. The appraisal engine/service provider valuator app 204a generates an updated appraisal using specific fields describing the item detected in the extracted EXIF/metadata. Using machine learning, the appraisal engine/service provider valuator app 204a searches for key gemological data points describing their asset that can be used to determine the item's value. The appraisal engine/service provider valuator app 204a uses the detected gemological data points to quantify the asset's value for auction or resale. The appraisal engine/service provider valuator app 204a will generate a confidence score regarding the submission that scores the integrity of the assessed value. The appraisal engine/service provider valuator app 204a compares the gemological data points with assessed values in other appraisals in its appraisal database 94 to assess a confidence in the assessed value. If the score provides confidence in the submission, the appraisal engine/service provider valuator app 204a prepares the updated appraisal into PDF format.

In some embodiments, appraisers/gemologists/valuators can use the appraisal system 200 to confirm, verify, and generate their appraisals.

At 506, the updated appraisal is stored in a smart wallet coupled with the image and video captures and existing appraisal. Contents of the smart wallet are converted into a token stored on a blockchain. In one embodiment, the token is non-fungible token (NFT). The NFT certifies it is a digital asset that is unique and therefore not interchangeable. The NFT is trackable on blockchains to provide the user with a proof of appraisal. The blockchain may be, for example, Ethereum, Flow, or Tezos or any other blockchain that supports NFTs and works to ensure that the token is authentically one of a kind. By preserving the updated appraisal and related files as an immutable record on the blockchain, the updated appraisal is self-authenticating.

As the process for generating the updated appraisal is remote, it is a safe an expeditious way to update an existing appraisal, while it still provides the essential information to be accurate. Further, the data from the three media submissions (photo of the appraisal, image of appraised asset, video of the appraised asset) are corroborated to ensure that the user is in possession of the item. For example, corroborated by the date, time, and latitude across the three submissions should be identical or similar.

Further, by confirming the authentication of the user device by generating a public/private key pair ceremony with the user device, endorsing of the device measurement record, and providing a self-authenticating updated appraisal, a third-party insurer can have confidence in the integrity of the authenticity and validity of the updated appraisal.

may be provided as a service. The registration may further include signing of a document that sets out the policy terms of the registration provider at the time of registration.

With the updated appraisal generated by the system 200, owners of valuable assets can know the current value of that asset. Owners of valuable assets can have peace of mind that their updated appraisal is immutable. Owners of valuable assets can obtain an updated valuation for their asset from the comfort of their home, or virtually anywhere. Additionally, appraisers/gemologists/valuators can perform valuation updates without physically needing to meet with the client.

The use of OCR to read the original appraisal expedites the valuation process by eliminating the need to reinspect the item, retype the description, or select drop down fields to create the description. The ease of submitting an existing appraisal will increase the likelihood that owners of assets will use the invention to obtain a value update. The feature of examining the metadata of the photos decreases fraud, by eliminating submissions from people who are able to acquire an appraisal document, without actually owning the piece of jewelry. Also, we eliminate users who have already lost the item and are looking to update the value so they can receive a larger settlement from their insurance company. Providing a QR code allows the client to easily access the appraisal update in the future, if they are not able to remember the company they used to obtain the update. Another unique feature is the queue system, allowing valuators to conduct valuations remotely.

In one embodiment, the videos capture may be encoded and password protected and can be accessed via QR code on the system 200. In one embodiment, the purpose of the video is to tell the story/history of the asset. In this way, the sentimental value of the asset can be preserved as well as historical value. The submission of the video is digitally signed to confirm that it is unaltered. The video submission may further include a customer interview describing and showing the asset to prove physical possession, showing the attributes of the asset. This video submission may be valuable to insurance carriers to enable real-time visual confirmation of possession of the asset.

As shown in FIG. 6, the video story of the asset may be created at 602. The user may describe the asset for documentation at 603. The user device 150 may upload the video story and edit the story of the asset for purposes of documenting its historical importance, not just for valuation purposes, but for historical preservation purposes. In this way, the history of the asset as understood by the owner of the asset can be preserved. The record of the transmission transaction can be recorded in the blockchain, and linked to the user's electronic wallet. The transaction can be implemented as a NFT on the blockchain. In another embodiment, the system 200 will support an inventory system enabling a user to track all assets to inventory their belongings.

While example embodiments have been particularly shown and described, it will be understood by those skilled in the art that various changes in form and details may be made therein without departing from the scope of the embodiments encompassed by the appended claims.

What is claimed is:

1. A digital appraisal system comprising:
an appraisal server in communication with a blockchain network,
the appraisal server configured to receive a request from a client device to prepare an updated digital appraisal in the blockchain communication network, and further configured to respond to the request by:
determining a geolocation of the client device;
receiving one or more submissions from the client device, the one or more submissions including: (i) an image capture of a prior textual appraisal of an asset, (ii) an image capture of the asset, and (iii) a video capture of the asset;
extracting both: (i) text data and (ii) metadata from the image capture of the prior textual appraisal;
comparing geolocation data associated with (i) the client device, (ii) the image capture of the prior textual appraisal, (iii) the image capture of the asset, and (iv) the video capture of the asset to verify integrity of the one or more submissions; and
responsive to the integrity of the one or more submissions being verified:
computationally generating an updated appraisal of the asset using:
(i) the extracted text data and metadata of the image capture of the prior textual appraisal, (ii) the image capture of the asset, and (iii) the video capture of the asset; and
recording the updated appraisal in a blockchain transaction via the blockchain network.

2. The digital appraisal system of claim 1, further comprising:
an electronic wallet configured to store the updated appraisal, the updated appraisal being configured as a non-fungible token (NFT),
the electronic wallet further configured to enable access to the updated appraisal via a QR code.

3. The digital appraisal system of claim 1, wherein the appraisal server is further configured to detect a presence or absence of at least one alteration of the image capture of the prior textual appraisal using one or more digital image manipulation detection algorithms.

4. The digital appraisal system of claim 1, wherein, responsive to the integrity of the one or more submissions being verified, the appraisal server is further configured to transmit an instruction to the blockchain network for recording the updated appraisal, such that at least a portion of the blockchain network responds by requiring multiple electronic signatures in order to accept a blockchain transaction recording the updated appraisal including:
requiring a first electronic signature that corresponds to processing of the updated appraisal, such that a verification of integrity of the first electronic signature is applied to the blockchain transaction; and
responding to the first electronic signature by verifying integrity of the first electronic signature.

5. The digital appraisal system of claim 1, wherein the appraisal server is further configured to transmit a QR code to the client device, the QR code configured to enable access to the updated appraisal.

6. The digital appraisal system of claim 1, further comprising:
a parser configured to computationally parse and index the extracted text data and metadata from the image capture of the prior textual appraisal;
a machine learning (ML) engine configured to compare the parsed and indexed extracted text data and metadata from the image capture of the prior textual appraisal with a corpus of data including a plurality of other appraisals; and
a classifier configured to classify the parsed and indexed extracted text data and metadata from the image capture of the prior textual appraisal based on the comparing;
wherein the appraisal server is further configured to computationally generate the updated appraisal based on the classifying.

7. The digital appraisal system of claim 1, wherein the appraisal server is further configured to:
computationally perform an internal validation of integrity of the image capture of the prior textual appraisal based on the extracted text data and metadata from the image capture of the prior textual appraisal.

8. The digital appraisal system of claim 1, wherein the appraisal server is further configured to:
computationally generate the updated appraisal of the asset via a machine learning (ML) module, the machine learning (ML) module configured to determine an exchange value of the asset based on one or more of: (i) the extracted text data and metadata of the image capture of the prior textual appraisal, (ii) the image capture of the asset, and (iii) the video capture of the asset.

9. The digital appraisal system of claim 8, wherein the machine learning (ML) module is further configured to determine a confidence score associated with determining the exchange value of the asset.

10. A method of providing a digital appraisal comprising, via an appraisal server in communication with a blockchain network:
said appraisal server receiving a request from a client device to prepare an updated digital appraisal in the blockchain network; and responsive to receiving the request, responding to the request by being configured to:
receiving one or more submissions from the client device, the one or more submissions including: (i) an image capture of a prior textual appraisal of an asset, (ii) an image capture of the asset, and (iii) a video capture of the asset;

and extracting both: (i) text data and (ii) metadata from the image capture of the prior textual appraisal; comparing geolocation data associated with (i) the client device, (ii) the image capture of the prior textual appraisal, (iii) the image capture of the asset, and (iv) the video capture of the asset to verify integrity of the one or more submissions;

and responsive to the integrity of the one or more submissions being verified: computationally generating an updated appraisal of the asset using (i) the extracted text data and metadata of the image capture of the prior textual appraisal, (ii) the image capture of the asset, and (iii) the video capture of the asset;

and recording the updated appraisal in a blockchain transaction via the blockchain network.

11. The method of claim 10, further comprising, via the appraisal server:

computationally performing an internal validation of integrity of the image capture of the prior textual appraisal based on the extracted text data and metadata from the image capture of the prior textual appraisal.

12. The method of claim 10, further comprising, via the appraisal server:

configuring an electronic wallet to store the updated appraisal, the updated appraisal being configured as a non-fungible token (NFT); and configuring the electronic wallet to enable access to the updated appraisal via a QR code.

13. The method of claim 10, further comprising, via the appraisal server:

detecting a presence or absence of at least one alteration of the image capture of the prior textual appraisal using one or more digital image manipulation detection algorithms.

14. The method of claim 10, further comprising, via the appraisal server:

responsive to the integrity of the one or more submissions being verified, transmitting an instruction to the blockchain network for recording the updated appraisal, such that at least a portion of the blockchain network responds by requiring multiple electronic signatures in order to accept a blockchain transaction recording the updated appraisal including:

requiring a first electronic signature that corresponds to processing of the updated appraisal, such that a verification of integrity of the first electronic signature is applied to the blockchain transaction; and responding to the first electronic signature by verifying integrity of the first electronic signature.

15. The method of claim 10, further comprising, via the appraisal server:

transmitting a QR code to the client device, the QR code configured to enable access to the updated appraisal.

16. The method of claim 10, further comprising:

via a parser, computationally parsing and indexing the extracted text data and metadata from the image capture of the prior textual appraisal;

comparing, via a machine learning (ML) engine, the parsed and indexed extracted text data and metadata from the image capture of the prior textual appraisal with a corpus of data including a plurality of other appraisals;

via a classifier, classifying the parsed and indexed extracted text data and metadata from the image capture of the prior textual appraisal based on the comparing; and via the appraisal server, computationally generating the updated appraisal based on the classifying.

17. The method of claim 10, further comprising, via the appraisal server:

computationally generating the updated appraisal of the asset via a machine learning (ML) module, the machine learning (ML) module configured to determine an exchange value of the asset based on one or more of: (i) the extracted text data and metadata of the image capture of the prior textual appraisal, (ii) the image capture of the asset, and (iii) the video capture of the asset.

18. The method of claim 17, wherein the machine learning (ML) module is further configured to determine a confidence score associated with determining the exchange value of the asset.

19. A non-transitory computer program product for providing a digital appraisal, the non-transitory computer program product comprising a computer-readable medium with computer code instructions stored thereon, the computer code instructions being configured, when executed by a processor, to cause an apparatus associated with the processor to:

implement an appraisal server, the appraisal server in communication with a blockchain network, the appraisal server configured to:

receive a request from a client device to prepare an updated digital appraisal in the blockchain network; and responsive to receiving the request, respond to the request by:

receiving one or more submissions from the client device, the one or more submissions including: (i) an image capture of a prior textual appraisal of an asset, (ii) an image capture of the asset, and (iii) a video capture of the asset;

extracting both: (i) text data and (ii) metadata from the image capture of the prior textual appraisal;

comparing geolocation data associated with (i) the client device, (ii) the image capture of the prior textual appraisal, (iii) the image capture of the asset, and (iv) the video capture of the asset to verify integrity of the one or more submissions; and responsive to the integrity of the one or more submissions being verified:

computationally generating an updated appraisal of the asset using (i) the extracted text data and metadata of the image capture of the prior textual appraisal, (ii) the image capture of the asset, and (iii) the video capture of the asset; and recording the updated appraisal in a blockchain transaction via the blockchain network.

20. The non-transitory computer program product of claim 19, wherein the appraisal server is further configured to:

computationally perform an internal validation of integrity of the image capture of the prior textual appraisal based on the extracted text data and metadata from the image capture of the prior textual appraisal.

* * * * *